US005527982A

United States Patent [19]
Pal et al.

[11] Patent Number: 5,527,982
[45] Date of Patent: * Jun. 18, 1996

[54] FIXATION AND STABILIZATION OF METALS IN CONTAMINATED MATERIALS

[75] Inventors: Dhiraj Pal, Chicago Heights; Karl W. Yost, Crete, both of Ill.

[73] Assignee: Sevenson Environmental Services, Inc., Niagara Falls, N.Y.

[*] Notice: The term of this patent shall not extend beyond the expiration date of Pat. No. 5,193,936.

[21] Appl. No.: 31,461

[22] Filed: Mar. 15, 1993

Related U.S. Application Data

[63] Continuation-in-part of Ser. No. 721,935, Jul. 23, 1991, Pat. No. 5,193,936, which is a continuation-in-part of Ser. No. 494,774, Mar. 16, 1990, abandoned.

[51] Int. Cl.$^6$ .................................................. E02D 3/00
[52] U.S. Cl. ........................... 588/256; 405/128; 210/751
[58] Field of Search ................................ 405/128, 129, 405/263, 266; 106/900; 210/751, 912, 747; 588/256

[56] References Cited

U.S. PATENT DOCUMENTS

| | | |
|---|---|---|
| 3,201,268 | 8/1965 | Hemwall . |
| 3,837,872 | 9/1974 | Conner . |
| 3,893,656 | 7/1975 | Opacic et al. . |
| 3,937,785 | 2/1976 | Gancy et al. . |
| 3,969,246 | 7/1976 | Feltz et al. . |
| 3,981,965 | 9/1976 | Gancy et al. . |
| 4,012,320 | 3/1977 | Conner et al. . |
| 4,116,705 | 9/1978 | Chappell . |
| 4,122,048 | 10/1978 | Buchwalder et al. . |
| 4,149,968 | 4/1979 | Kupiec et al. . |
| 4,268,486 | 5/1981 | Noack et al. . |
| 4,318,788 | 3/1982 | Duffey . |
| 4,336,142 | 6/1982 | Bye . |
| 4,379,763 | 4/1983 | Clemens et al. . |
| 4,401,573 | 8/1983 | Perrone et al. . |
| 4,432,666 | 2/1984 | Frey et al. . |
| 4,443,133 | 4/1984 | Barrett . |
| 4,446,026 | 5/1984 | Beutier et al. . |
| 4,518,508 | 5/1985 | Conner . |
| 4,530,765 | 7/1985 | Sabherwal . |
| 4,629,509 | 12/1986 | O'Hara et al. . |
| 4,652,381 | 3/1987 | Inglis . |
| 4,671,882 | 6/1987 | Douglas et al. . |
| 4,678,584 | 7/1987 | Elfline . |
| 4,680,126 | 7/1987 | Frankard et al. . |
| 4,684,472 | 3/1987 | Abbe et al. . |
| 4,701,219 | 10/1987 | Bonee . |
| 4,737,356 | 4/1988 | O'Hara et al. ................. 588/256 |
| 4,741,776 | 5/1988 | Bye et al. . |
| 4,798,708 | 1/1989 | Ladd et al. . |
| 4,853,208 | 8/1989 | Reimers et al. . |
| 4,889,640 | 12/1989 | Stanforth . |
| 4,935,146 | 6/1990 | O'Neill et al. . |
| 4,950,409 | 8/1990 | Stanforth . |
| 5,000,858 | 3/1991 | Manning et al. . |
| 5,002,645 | 3/1991 | Eastland, Jr. et al. . |
| 5,009,793 | 4/1991 | Muller . |
| 5,037,479 | 8/1991 | Stanforth . |
| 5,053,139 | 10/1991 | Dodwell et al. . |
| 5,162,600 | 11/1992 | Cody et al. . |
| 5,193,936 | 3/1993 | Pal et al. . |

FOREIGN PATENT DOCUMENTS 2277594  11/1990  Japan .

*Primary Examiner*—George A. Suchfield
*Attorney, Agent, or Firm*—Kevin E. McDermott

[57] ABSTRACT

The present invention discloses a method of treating lead bearing process materials and lead toxic hazardous wastes. The invention relates to treatment methods employed to chemically convert leachable lead in lead bearing solid and liquid waste materials to a non-leachable form by mixing the material with lime, gypsum and/or phosphoric acid. The solid and liquid waste materials include contaminated sludges, slurries, soils, wastewaters, spent carbon, sand, wire chips, plastic fluff, cracked battery casings, bird and buck shots and tetraethyl lead contaminated organic peat and muck. The present invention discloses a process comprising a single step mixing of one or more treatment additives, and a process comprising a two step mixing wherein the sequence of performing the steps may be reversible. The present invention provides a new way of treating a universe of lead contaminated materials at any pH.

31 Claims, 3 Drawing Sheets

FIXATION AND STABILIZATION OF METALS IN CONTAMINATED MATERIALS

This application is a continuation-in-part of U.S. patent application Ser. No. 07/721,935, filed Jul. 23, 1991, now U.S. Pat. No. 5,193,936, which is a continuation-in-part of U.S. patent application Ser. No. 07/494,774, filed Mar. 16, 1990, now abandoned.

FIELD OF THE INVENTION

The present application describes treatment methods for metal-bearing materials, especially lead-bearing materials, such as process streams, sludges and slurries, including all types of liquid and solid wastes.

BACKGROUND OF THE INVENTION

Only a few prior art patents have taught the immobilization of lead in different kinds of wastes to make the treated residuals suitable for disposal as special waste in a RCRA approved and licensed landfill facility. For example, some known methods to treat broader groups of metals are shown in U.S. Pat. No. 4,149,968 to Kupiec et al., U.S. Pat. Nos. 4,889,640 and 4,950,409 to Stanforth, U.S. Pat. No. 4,701,219 to Bonee, U.S. Pat. No. 4,652,381 to Inglis, and U.S. Pat. No. 4,671,882 to Douglas et al.

Kupiec et al. teaches the immobilization of heavy metals by treating an alkaline slurry of waste with a mixture of bentonite clay and Portland Cement.

Stanforth teaches a method of treating solid hazardous waste (containing unacceptable levels of lead and cadmium) with reactive calcium carbonate, reactive magnesium carbonate and reactive calcium magnesium carbonate. The patent teaches that addition of water is beneficial to facilitate the mixing of the solid waste with treatment additive and conversion of lead into non-leachable forms. Stanforth further discloses mixing solid waste with lime and carbon dioxide or bicarbonate.

Bonee discloses that calcium chloride, calcium carbonate, gypsum and sodium carbonate are relatively ineffective at reducing the leaching of vanadium and nickel from a petroleum cracking process particulate waste.

Douglas et al. discloses a process for producing a non-hazardous sludge from an aqueous solution by addition of phosphoric acid or an acid phosphate salt, adjusting the Ph to about 5, adding a coagulating polymer and raising the Ph to above 7 through the addition of lime. Then, the process includes dewatering the resulting sludge. This constitutes at least 5 or more steps making it cumbersome, time consuming and expensive.

Inglis teaches a process of treating industrial wastewater which has a pH of 2 and which is contaminated with sulfuric acid, lead, copper and zinc. Calcium carbonate is added along with air to wastewater. This results in neutralization and formation of insoluble metal salts. The process is not applicable to wastes that have a pH of 6 to 9. However, limestone is relatively ineffective in removing lead from hazardous, solid or sludge material. Limestone does not react in the solid materials and metal carbonates that are formed are subject to degradation by acid rain and acidic landfill leachate conditions.

Hazardous wastes containing excessive amounts of leachable lead are banned from land disposal. The regulatory threshold limit under Resource Cons. and Recovery Act is 5 mg/l of leachable lead as measured by TCLP (toxicity characteristic leaching procedure) test criteria, United States Environmental Protection Agency (USEPA) method 1311 (SW-846). Waste materials containing TCLP lead levels in excess of 5 mg/l are defined as lead-toxic hazardous waste and are as such restricted from landfilling under current land ban regulations. The cost of disposing lead toxic hazardous waste materials in excess of $200.00 per ton plus the cost of transporting the hazardous material to landfills for hazardous wastes, which do not exist in every state. This makes the disposal of lead toxic hazardous waste materials very expensive. Therefore, treating the lead-bearing process materials and waste streams to render them non-hazardous by RCRA definition would cut down the costs of transportation and disposal tremendously.

SUMMARY OF THE INVENTION

The present invention discloses a method of treating metal-bearing, especially lead-bearing process materials and lead-toxic hazardous wastes.

The present invention relates to a chemical treatment technology for immobilizing leachable lead in contaminated soils and solid waste materials. According to the present invention, a process for treating lead-toxic solid wastes in order to stabilize the leachable lead is disclosed, comprising the steps of: (i) mixing the solid waste with a sulfate compound, such as calcium sulfate dihydrate (gypsum powder) or sulfuric acid, having at least one sulfate ion for contacting waste particles and reacting with said leachable lead to produce a substantially insoluble lead composition, such as anglesite and/or calcium-substituted anglesite; and, (ii) mixing said solid waste and sulfate compound with a phosphate reagent, such as phosphoric acid, having at least one phosphate ion for reacting with said leachable lead to produce a substantially insoluble lead composition. The treated material from this process is substantially solid in form and passes the Paint Filter Test while satisfying the regulatory standard for TCLP lead. In all instances, application of this process has been found very reliable in meeting the treatment objectives and in consistently decreasing waste volume.

It is an object of the present invention to provide a technology for treatment of lead-containing solid waste and soil that produces an acceptably low level of leachable lead in the final product to comply with the statutory requirements of TCLP and to pass the Paint Filter Test.

Another object of the invention is to provide such a process while producing no wastewater or secondary waste streams during said process.

Still another object of the invention is to provide such a process which also causes the solid waste material to undergo a volume reduction as a result of treatment.

Yet another object of the invention is to cause fixation of the leachable lead in the solid waste that is permanent under both ordinary and extreme environmental conditions.

The invention relates to treatment methods employed to chemically convert leachable metal in metal-bearing solid and liquid waste materials to a non-leachable form by mixing the material with one or a combination of components, for example, lime or gypsum and phosphoric acid. The solid and liquid waste materials include contaminated sludges, slurries, soils, wastewaters, spent carbon, sand, wire chips, plastic fluff, cracked battery casings, bird and buck shots and tetraethyl lead contaminated organic peat and muck. The metal-bearing materials referred to herein which the present invention treats include those materials having leachable lead, aluminum, arsenic (III), barium, bismuth, cadmium, chromium (III), copper, iron, nickel, selenium, silver and zinc. The present invention discloses a process comprising a single step mixing of one or more treatment additives, and a process comprising a two step mixing wherein the sequence of performing the steps may be reversible. The present invention provides a novel way of treating a plurality of metal-contaminated materials at a wide range of pH. The method works under acidic, alkaline and neutral conditions.

The processes of the present invention provide reactions that convert leachable metals, especially lead, into a non-leachable form which is geochemically stable for indefinite periods and is expected to withstand acid rain impacts as well as the conditions of a landfill environment.

A first group of treatment chemicals for use in the processes of the present invention includes lime, gypsum, alum, halites, portland cement, and other similar products that can supply sulfates, halides, hydroxides and/or silicates.

A second group consists of treatment chemicals which can supply phosphate ions. This group includes products such as phosphoric acid, pyrophosphates, triple super phosphate (TSP), trisodium phosphate, potassium phosphates, ammonium phosphates and/or others capable of supplying phosphate anion when mixed with a metal-bearing process material or with a metal-toxic hazardous waste. Depending on the process material or waste (i) matrix (solid, liquid or mixture thereof), (ii) category (RCRA or Superfund/CERCLIS), (iii) chemical composition (TCLP lead, total lead level, pH) and (iv) size and form (wire fluff, shots, sand, peat, sludge, slurry, clay, gravel, soil, broken battery casings, carbon with lead dross, etc.) the metal-bearing material is mixed with one or more treatment chemicals in sufficient quantity so as to render the metal substantially non-leachable, that is, to levels below the regulatory threshold limit under the TCLP test criteria of the USEPA. For lead-bearing material, the treatment additives render the lead below the regulatory threshold limit of 5 mg/l by the TCLP test criteria of the USEPA. The disposal of lead-hazardous and other metal-hazardous waste materials in landfills is precluded under land ban regulations.

It is an object of the present invention to provide a method of treating metal-bearing materials, contaminated soils and waste effluent, and solid wastes containing hazardous levels of leachable metal. It is a further object to provide a method which decreases the leaching of lead in lead-bearing materials to levels below the regulatory limit of 5 mg/l by TCLP test criteria.

It is another object of the present invention to provide a method to immobilize lead to leachable levels below 5 mg/l by TCLP test criteria, through the use of inexpensive, readily accessible treatment chemicals. With this method the leachability of lead is diminished, usually allowing municipal landfill disposal which would not otherwise be permitted.

Yet another object of the present invention is to provide a treatment method for metal-bearing wastes, particularly lead-bearing wastes, which comprises a single step mixing process or a two-step process wherein the sequence of the two steps may be reversed.

Another object of the present invention is to provide a method of treating a wide variety of lead bearing process materials, wire fluff and chips, cracked battery plastics, carbon with lead dross, foundry sand, lead base paint, leaded gasoline contaminated soils, peat and muck, sludges and slurries, lagoon sediment, and bird and buck shots, in order to render the material non-hazardous by RCRA definition, and pass the EPTOX, MEP, ANS Calvet and DI Water Extract tests.

Another object of the present invention is to extend the scope for broad application in-situ as well as ex-situ on small as well as large quantities of metal-bearing process materials or generated waste streams.

The present invention provides a method which converts metal-toxic process materials and hazardous wastes into a material which has a lower leachability of metal as determined by EPA's TCLP test. Such treated waste material can then be interned in a licensed landfill, a method of disposal only possible when the leachability of metal is diminished/reduced to levels below the regulatory threshold limit by TCLP test criteria, e.g., lead below 5 mg/l.

The invention may be more fully understood with reference to the accompanying drawings and the following description of the embodiments shown in those drawings. The invention is not limited to the exemplary embodiments but should be recognized as contemplating all modifications within the skill of an ordinary artisan.

DESCRIPTION OF THE PREFERRED EMBODIMENT

Figure 1:
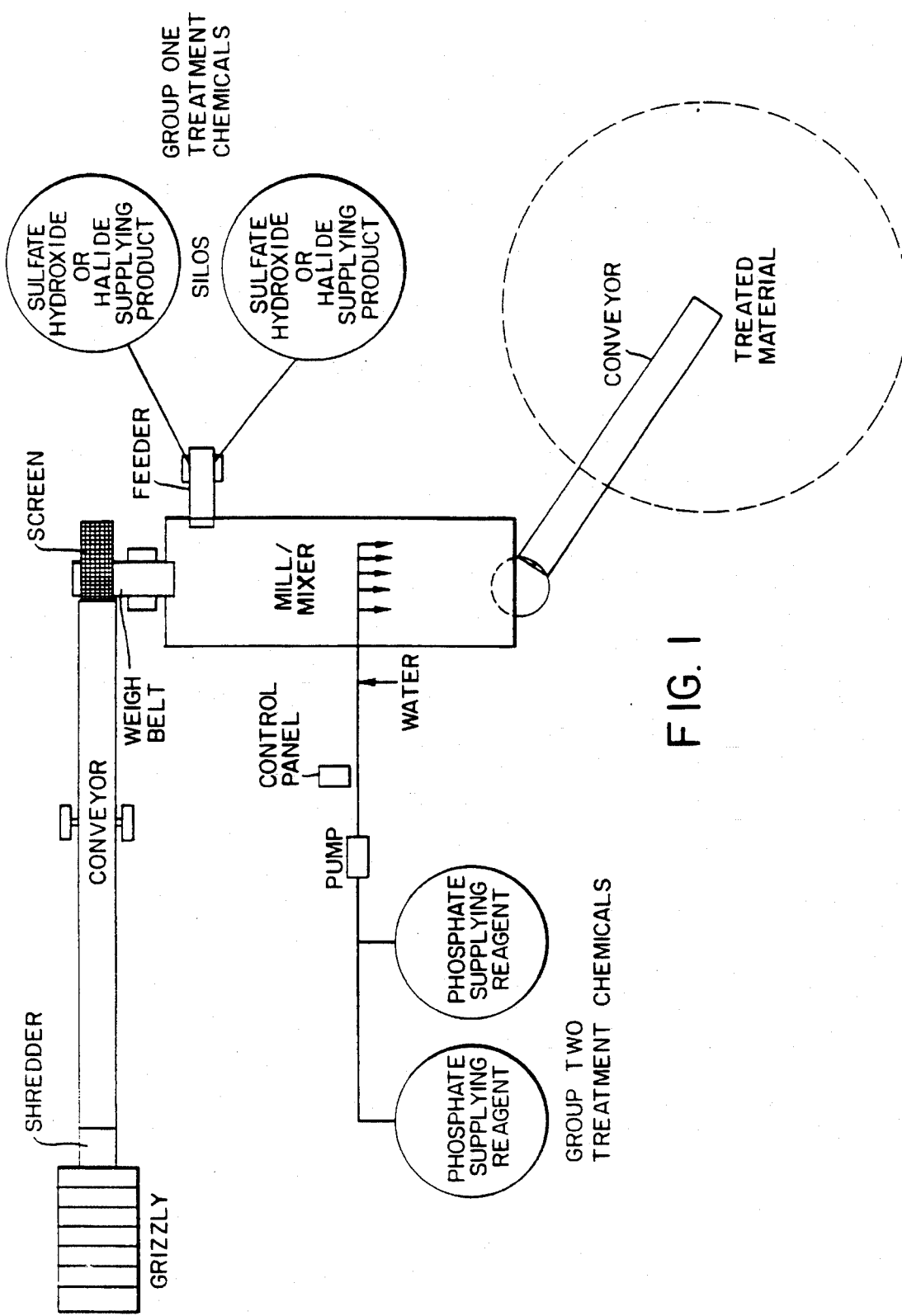
FIG. 1 exhibits the single step mixing method of treatment chemicals metered into the pugmill or Maxon Mixer capable of processing lead hazardous waste materials at rates up to 100 tons/hour.
Figure 2A:
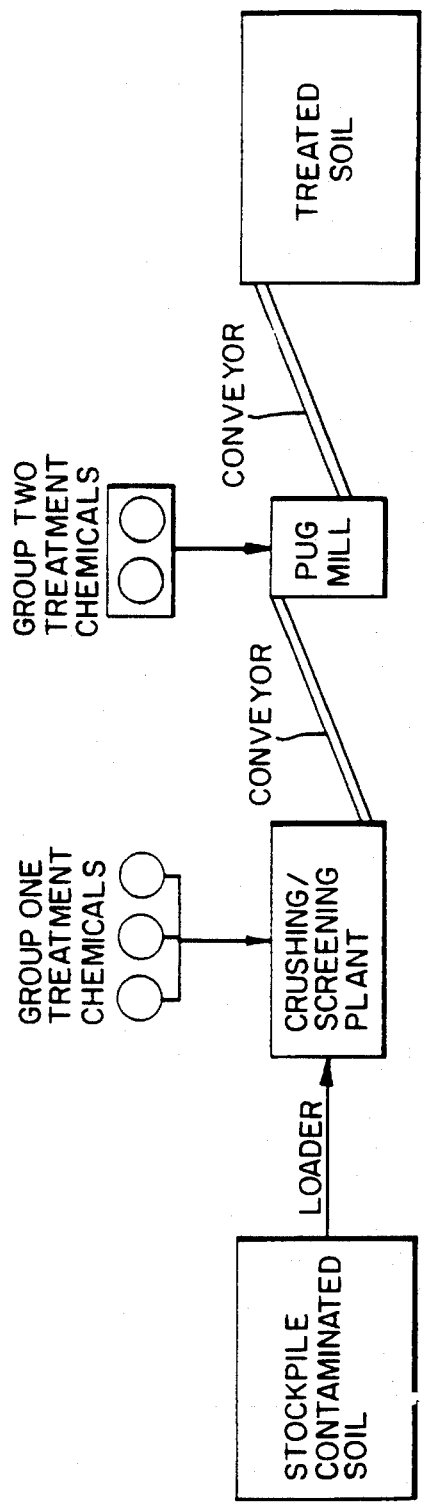
FIG. 2(a) exhibits the two step mixing method with addition of group one treatment chemicals during step I and addition of group two treatment chemicals during step II.
Figure 2B:
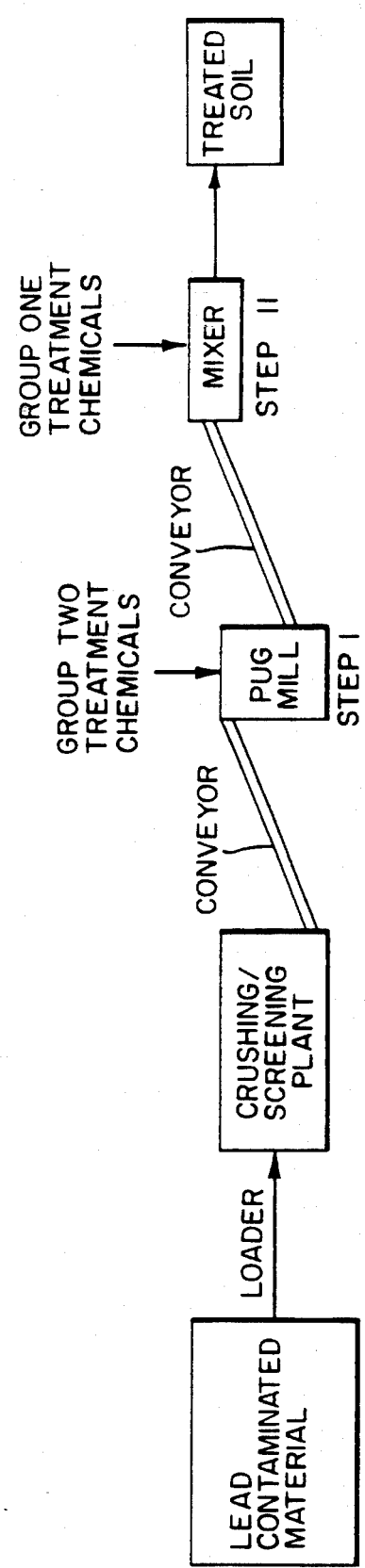
FIG. 2(b) exhibits the two step mixing method with addition of group two treatment chemical(s) during step I and addition of group one treatment chemical(s) during step II. The reversibility of steps and combination of both steps into a single step is the discovery that is disclosed in this invention and illustrated in FIG. 1 and 2(a) and (b).

According to the present invention, leachable lead in treated materials is decreased to levels well below 5.0 mg/l, measured by TCLP test criteria. Waste and process materials having a TCLP lead level in excess of 5 mg/l are considered hazardous and must be treated to be brought into compliance with regulatory requirements. Other metal-bearing materials having leachable may also be treated according to the present invention to achieve acceptable metal levels.

The treatment technology according to another embodiment of the present invention consists of a two step process for treating contaminated soils and/or solid waste materials with chemical treating agents that convert leachable lead to synthetic (man-made) substantially insoluble lead mineral crystals. As used here, "substantially insoluble" means the leachable lead content in the treated waste sample is less than 5.0 mg/l in the extract by the TCLP Test.

Treatment Chemicals and Additives

The treatment chemicals useful in the present invention may be divided into two groups. The addition of water with the additives may facilitate the ultimate mixing and reaction.

A first group, "group one", comprises of a source of sulfate, hydroxide, chloride, fluoride and/or silicates. These sources are gypsum, lime, sodium silicate, cement, calcium fluoride, alum and/or like similar products.

The second group, "group two", comprises a source of phosphate anion. This group consists of products like phosphoric acid (phosphoric), pyrophosphates, triple super phosphate, trisodium phosphates, potassium phosphates, ammonium phosphates and/or similar compounds capable of supplying a phosphate anion.

The first step of this novel process comprises the reaction of leachable lead in contaminated soils or solid waste materials with a gypsum powder, calcium sulfate dihydrate ($CaSO_4.2H_2O$). Calcium sulfate dihydrate powder reacts with leachable and mobile lead species in wastes to form hard sulfates, which are relatively insoluble in water. In the invention, the powder form of dry calcium sulfate dihydrate, or gypsum, is preferred for blending with lead contaminated materials because it provides a uniform cover or dry coating over the surfaces of the waste particles and aggregates under low moisture conditions. The greatest benefit and fastest reaction is achieved under conditions wherein 95% of the powder is passable through a 100 mesh sieve, and the remaining 5% is passable through a 20 mesh sieve.

The amount of gypsum powder employed is typically from 0–30 percent of the weight of solid waste material being treated. The actual amount employed will vary with the degree and type of lead contamination in the waste material or soil, and with the initial composition as well as the condition of the waste material, among other factors.

Alternatively, sulfuric acid, or alum in liquid or powder form can also be used as sources of sulfate ion in certain solid wastes that contain sufficient calcium prior to treatment.

Treatment Method

At least one component from group one is added to the mixing vessel or reactor, preferably as a dry powder although slurries could be pumped under certain circumstances. At least one component from group two is added to the mixing vessel or reactor as either liquid reagent or as granular solid materials.

The ingredients of group one and group two can be added to the hazardous waste materials simultaneously, and they are pre-mixed and added in a single step. Alternatively, the components of group one and two can be added sequentially in a two-step process with either component added first. That is, the two steps may occur in any order. At least one ingredient of group one can be added in step I or step II. Likewise, at least one ingredient of group two can be added in either step I or step II. Enough water may be added to allow good mixing to prevent dust formation, and to permit good chemical reaction. Not too much water is added to solid materials if the treated waste is to pass the paint filter test.

In the first step of the instant process, a thorough and uniform mixing of gypsum powder with the solid waste is accomplished by mixing shredded and screen waste particles with small gypsum particles in, for example, a grizzly or other mixing device. The calcium ions from the gypsum powder displace lead from soil complexes and organic micelles present in the contaminated soil and solid waste material. The following equations (1) and (2) described the reaction of leachable lead with gypsum.

(1)

Anglesite

(2)

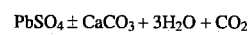

Anglesite

The reaction of lead with gypsum forms a "hard sulfate" which crystallizes into mineral species of the barite family—anglesites and calcium-substituted anglesites—which are insoluble in water. The solubility product of lead sulfate is $1.8 \times 10^{-8}$, indicating that anglesite crystals would continue to develop over the geologic periods.

In the second step of the process, the solid waste material as amended with gypsum powder is treated with a phosphate-supplying reagent reacts chemically to immobilize the remaining leachable lead. The phosphate-supplying reagent includes phosphate ion sources having one or more reactive phosphate ions, such as phosphoric acid, trisodium phosphate, a potassium phosphate and monobasic or dibasic calcium phosphates.

The quantity of phosphate-supplying reagent employed will vary with the characteristics of the solid waste being treated, including particularly such factors as leachable lead content, total lead, and buffering capacity, among other factors. It has been determined that in most instances a quantity of phosphoric acid up to 30 percent of the weight of the waste material is sufficient. The concentration of phosphoric acid in solution will typically range from about 2–75 percent by weight. The solution and treatment process are maintained above 30° F. to permit the handling of the phosphoric acid as a liquid reagent. Below 30° F., the phosphoric acid tends to gel while water freezes to form ice, thus creating material handling problems.

Free lead, along with calcium ions found in the solid waste (including those imparted through the first step of the process), reacts with the phosphate to form insoluble super-hard rock phosphates or calcium substituted hydroxy lead apatites as shown in equation (3a and b):

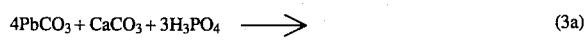
(3a)

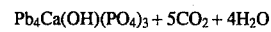

Hydroxy Lead Apatites

(3b)

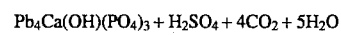

Hydroxy Lead Apatites

The phosphate ions are added to the contminated soils in solution form; for example, phosphoric acid may be added to water in amounts ranging from about 2 percent to about 75 percent by weight. Phosphoric acid decomposes carbonates and bicarbonates in waste leading to the synthesis of apatites and evolution of carbon dioxide gas. Destruction of carbonates and bicarbonates contributes to desirable volume reductions.

Although water molecules are generated during the carbonate and bicarbonate decomposition process, it is preferred to have soil moisture at about 10 percent to about 40 percent by weight of the soil in order to accelerate the fixation of the leachable lead with the phosphate ions. At this moisture range, material handling is also easy and efficient. It is apparent from Equations (2), (3a) and (3b) that gypsum and phosphoric acid decompose carbonates and bicarbonates during synthesis of new stable minerals of the barite, apatite, and pyromorphite families in soils (as shown in Table I). Decomposition of carbonates and bicarbonates is usually associated with the evolution of carbon dioxide, formation of hydroxyl group, (OH—), and the release of water molecules. As the water evaporates and carbon dioxide molecules are lost to the atmosphere, the treated waste mass and volume are decreased significantly.

The solid sulfate powder and the phosphate-supplying reagent are added to contaminated soil and solid waste material having a typical moisture content ranging from about 10 percent to about 40 percent by weight. At a moisture level within the foregoing range, the curing time of the treated materials is approximately 4 hours, which provides adequate time for chemical reactions to occur and immobilize the leachable lead species. Crystals of various lead mineral species begin to form immediately, but will continue over long time periods with an excess of treatment chemicals present. This contributes to "self-healing," as noted during treatability studies as well as full scale treatment operations.

Under the foregoing condition, the immobilization of leachable lead occurs in a relatively dry environment because no wet byproducts, slurries or wastewater are produced by the process of the present invention. Operation of the process under relatively dry conditions beneficially allows cost-efficient handling of the contaminated soils and the waste materials. This allows compliance with Paint Filter Test for solid waste required by USEPA and RCRA approved solid waste landfill facilities. Effective mechanical mixing, as by a pug mill or other such mixing device, eliminates the need for diffusion in the nonaqueous solid waste matrix.

The water resistant and insoluble lead minerals synthesized in oils and solid wastes according to this process are stable, and would behave like naturally occurring rock phosphates and hard sulfates. A list of these synthetic lead mineral species and complexes is presented in Table I below, in order of the relative abundance found during characterization of treated soil by x-ray florescence spectrometry, polarized light microscopy (PLM) and scanning electron microscopy (SEM).

TABLE I

Synthetic Mineral Species of Lead Detected in a
Treated Sample (Listed in Decreasing Order of Abundance)

| | |
|---|---|
| 31–41% | Calcium Substituted Hydroxy Lead Apatites, $Ca_{0.5-1.5}Pb_{3.5-4.5}(OH)(PO_4)_3$ |
| 28–29% | Mixed Calcium Lead Phosphate Sulfates, $Ca_{0.05-0.2}Pb_{0.8-0.95}(PO_4)_{0.15-0.5}(SO_4)_{0.25-0.75}$ |
| 22–22% | Mixed Calcium Anglesites, $Ca_{0.05-0.3}Pb_{0.7-0.95}(SO_4)$ |
| 3–6% | Anglesites, $PbSO_4$ |
| 2–7% | Lead Hydroxy/Chlor Apatite, $Pb_5(PO_4)_3(OH)_{0.5}Cl_{0.5}$ |
| 1–3% | Pyromorphite, $Pb_3(PO_4)_2$ |
| 1–2% | Organo-Lead Phosphate Sulfate, Humus-o-$Pb_3(PO_4)(SO_4)$ |

Some of the chemical reactions that occur during the curing stage, and lead to the development of mixed minerals containing both sulfates and phosphates, are illustrated in equations (4) and (5).

$$18PbCO_3 + 5CaSO_4 \cdot 2H_2O + \quad (4)$$

$$12H_3PO_4 \xrightarrow[\text{Temperature (>30° F.) \& Pressure}]{\text{Cure Time = 4 hrs under Ambient}}$$

$$20\,Ca_{0.1}Pb_{0.9}(PO_4)_{0.5}(SO_4)_{0.25} + Ca_3(PO_4)_2 + 18CO_2 + 28H_2O$$

Mixed Calcium Lead Phosphate Sulfate $$6Pb[Humus] + 2CaSO_4 \cdot 2H_2O + \quad (5)$$

$$3H_3PO_4 \xrightarrow[\text{Temperature (>30° F.) \& Pressure}]{\text{Cure Time = 4 hrs under Ambient}}$$

$$Ca(9H)[Humus]\text{-}Pb_3(PO_4 + SO_4 +$$

Organo-Lead Phosphate Sulfate $$2H_2O + Ca_{0.3}Pb_{0.7}SO_4 + Ca_{0.7}Pb_{2.3}(PO_4)_2$$

Anglesite    Pyromorphite
(Ca substituted)

The process of the present invention beneficially decrease the volume of the waste materials through: (i) the evolution of carbon dioxide during the chemical decomposition of carbonates and bicarbonates, upon reaction with the acidic component in gypsum and phosphoric acid, and (ii) hardening and chemical compaction as a result of the synthesis of new minerals which result in changes in interstitial spaces and interlattice structures.

Applications of the process on a lead contaminated soil was associated with pore space decrease from 38.8% to 34.3% by volume. A decrease in pore space was associated with increased compaction of the treated soils and a decrease in overall waste volume ranging from 21.4% to 23.0%. For different waste types, the volume decrease varies with the amount of treatment chemicals used in the process. In another lead toxic solid waste, application of this process resulted in a volume decrease of the order of 36.4% while decreasing the leachable lead to levels below the regulatory threshold.

This reduction in volume of the contaminated soil and the solid waste material makes the process of the present invention particularly beneficial for off-site disposal in a secured landfill by cutting down the costs of transportation and storage space. The process can be accomplished at a cost-efficient engineering scale on-site or off-site for ex-situ treatment of lead-toxic solid wastes. This innovative treatment technology also offers a great potential for in-situ application to immobilize lead most economically without generation of any wastewater or byproducts.

Figure 3:
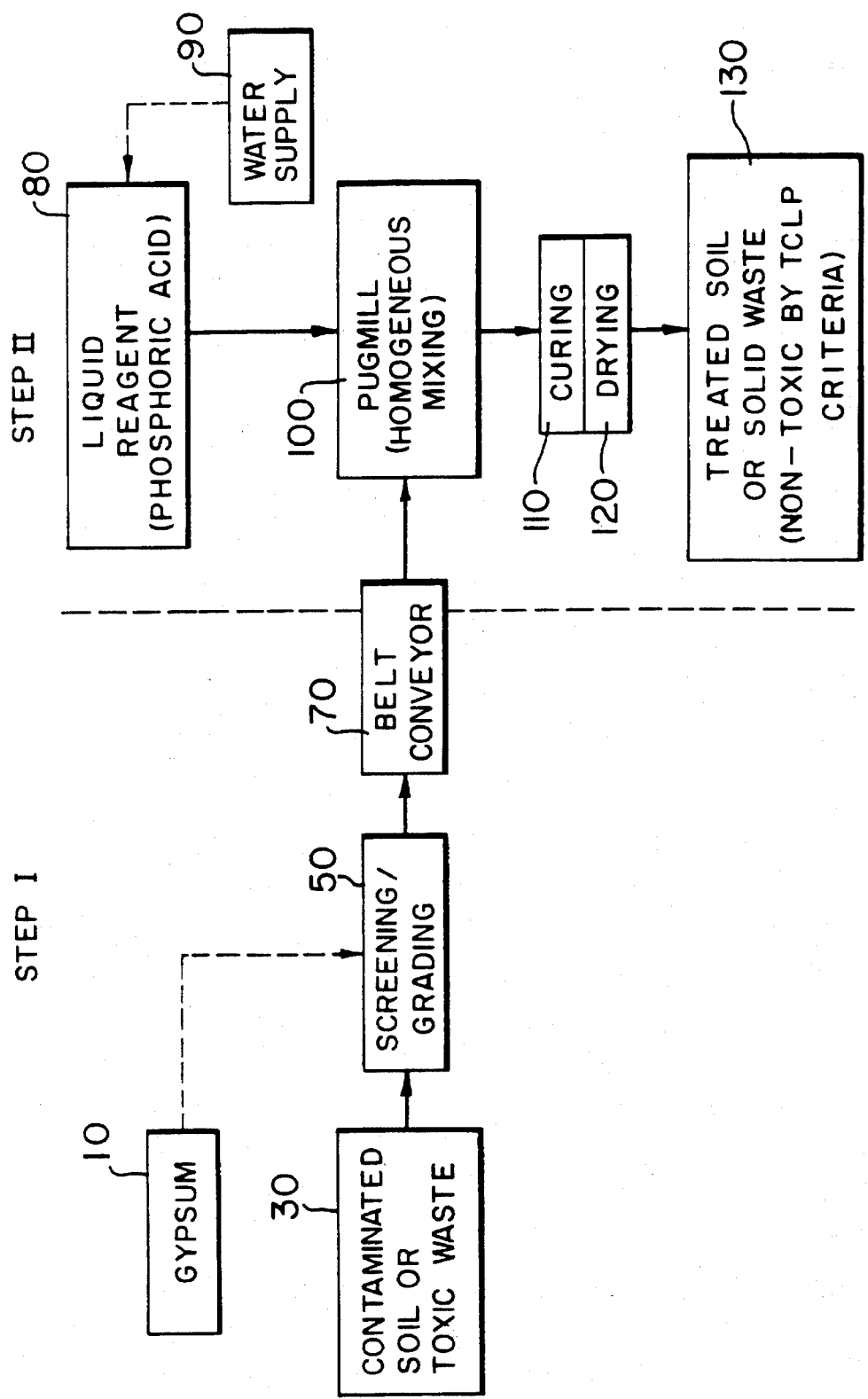
FIG. 3 is a block diagram of one embodiment of the treatment technology of the present invention.

FIG. 3 illustrates schematically the process of the present invention. The lead-contaminated uncontrolled hazardous waste site 10 with lead-toxic waste is subject to excavation and segregation 20 of waste piles based on their total lead and TCLP lead contents into (a) heavily contaminated pile 30A, (b) moderately contaminated waste pile 30B and (c) least contaminated waste pile 30C. The staged soil and solid waste material in piles 30A, 30B and 30C is subjected to grinding, shredding, mixing 40 and screening 50 through an appropriately sized mesh sieve. The screening yields particles that are usually less than 5 inches in diameter for mixing with gypsum powder 60 in a grizzly that allows a uniform coating of gypsum over the soil particles and waste aggregates during the grinding, shredding and/or mixing step. Alternatively, as shown by the dashed line, gypsum powder 10 may be added continuously to the screened solid waste material in prescribed amounts as determined during treatability trials. Most of the leachable lead binds chemically with gypsum at molecular level to form lead sulfate, which crystallizes into a synthetic nucleus of mixed calcium anglesite and pure anglesite minerals identified in the treated material by chemical microscopy techniques.

The gypsum-coated waste particles and aggregates are the transported on a belt conveyor 70 or other conveying means to an area where an effective amount of phosphoric acid solution 80 of specified strengths in water 90 is added or sprayed just prior to thorough mixing in a pug mill 100 (or other mixing means). The temperature of the phosphoric solution is preferably maintained above 30° F. to prevent it from gelling. The treated soil and wastes are subject to curing 110 and drying 120 on a curing/drying pad, or may less preferably be cured and dried using thermal or mechanical techniques. The end product of the process passes the Paint Filter Test. During the curing time of about four hours, various "super-hard phosphate" mineral species, such as calcium-substituted hydroxy lead-apatites and mixed calcium-lead phosphate-sulfate mineral species, are formed in treated waste media 130. Crystals of these mineral species (in early stages of development) have been identified in the treated soil materials and solid waste by geo-chemical and microscopy techniques like PLM and SEM.

The proportions of waste materials and reagents used in the produce lead sulfate in contaminated solid or solid waste material. In addition, the amount of phosphate-supplying reagent is prescribed in an amount sufficient to produce mineral species such as hydroxy-lead apatite in contaminated soil or solid waste material during a relatively short curing time of 4 hours, usually ranging from about 3 to about 5 hours. Further drying of the treated material may take 24 to 96 hours, but has not been required in any application to date. Table II documents the optimum curing time of 4 hours for the process. In all instances, the leachable lead as measured by the EP Toxicity Test Produce was found below 0.6 mg/l and the differences between analytical values below this level and statistically insignificant.

TABLE II

Documentation of Optimum Curing Time
Using EP Toxicity Test criteria for lead fixation

| Waste Matrix Category | EP Toxic Pb (Untreated Sample) mg/l | EP Toxic Pb Concentration in mg/l found in processed sample at a Curing Time of | | |
|---|---|---|---|---|
| | | 4 Hrs. mg/l | 48 Hrs. mg/l | 96 Hrs. mg/l |
| Pb Toxic Soil A | 495 | 0.4 | 0.4 | 0.6 |
| Pb Toxic Soil B | 46 | 0.3 | 0.2 | 0.2 |
| Pb Toxic Soil C | 520 | 0.3 | 0.5 | 0.5 |

The amount of the gypsum powder and the phosphoric acid employed will be dependent on the amount of contaminant present in the soil, initial characteristics of the solid waste material, whether the material is in-situ or is excavated and brought to an off-site facility for treatment; the same is true for other sulfate compounds and phosphate reagents. The following Example I describes various ratios of the chemical reagents for application to the excavated lead-contaminated solid wastes in order to render the leachable lead substantially insoluble; i.e., to reduce the leachable lead to levels below 5.0 mg/l by EP Toxicity Test lead and TCLP Test criteria now in force under current land-ban regulations.

Temperature and Pressure

Ambient temperature and pressure may be used for the disclosed treatment process, permitted the operations of the feeding and mixing equipment allow such. Under sub-freezing conditions, phosphoric acid may be heated to 50° F. to prevent it from gelling and in order to keep it in a pumpable viscosity range.

Treatment System Design

The treatment may be performed under a batch or continuous system of using, for example, a weight-feed belt or platform scale for the metal-hazardous waste materials and a proportionate weight-belt feed system for the dry ingredient or ingredients and powders of at least one of the groups. A metering device, e.g., pump or auger feed system, may instead, or additionally, be used to feed the ingredients of at least one of the groups.

EXAMPLE 1

Single Step Mixing of Treatment Chemicals

A lead contaminated soil from a battery cracking, burning, and recycling abandoned site was obtained and treated with group one and group two chemicals in one single step at bench-scale. The contaminated soil contained total lead in the range of 11.44% to 25.6% and TCLP lead in the range of 1781.3 mg/l to 3440 mg/l. The bulk density of contaminated soil was nearly 1.7 g/ml at moisture content of 10.3%. The contaminated soil pH was 5.1 with an oxidation reduction potential value of 89.8 mV. To each 100 g lot of lead hazardous waste soil, sufficient amounts of group one and group two treatment chemicals and reagents were added as illustrated in Table III, in order to render it non-hazardous by RCRA (Resource Conservation and Recovery Act) definition.

TABLE III

| Test Run | Treatment Additive(s) | TCLP Lead (mg/l) |
|---|---|---|
| I | 5% lime, 5% gypsum, 10.2% phosphoric | 0.5 |
| II | 12% phosphoric, 10% potassium sulfate | 2.2 |
| III | 12% phosphoric, 10% sodium sulfate | 3.5 |
| IV | 15% TSP | 3.7 |
| V | 12% phosphoric, 10% Portland Cement I | 0.2 |
| VI | 12% phosphoric, 10% Portland Cement II | 0.9 |
| VII | 12% phosphoric, 10% Portland Cement III | 0.3 |
| VIII | 12% phosphoric, 10% gypsum | 4.6 |
| IX | 15% TSP, 10% Portland Cement I | 0.1 |
| X | 15% TSP, 10% Portland Cement II | 0.2 |
| XI | 15% TSP, 10% Portland Cement III | 0.2 |
| XII | 15.1% phosphoric | 3.6 |
| XIII | 10% trisodium phosphate, 10% TSP | 1.2 |
| XIV | 6.8% phosphoric, 4% TSP | 4.5 |
| XV | 10% gypsum | 340 |
| XVI | 12% phosphoric, 5% lime | 0.9 |
| Control | Untreated Check | 3236.0 |

It is obvious from TCLP lead analyses of fifteen test runs that the single step mixing of at least one component of either or both group one and group two treatment chemicals is very effective in diminishing the TCLP lead values. In test run I, mixing of lime and gypsum from group one additives and phosphoric from group two decreased the TCLP lead to levels below 1 mg/l from 3440 mg/l with a curing time of less than 5 hours. Although the treatment chemicals of group two are more effective in decreasing the TCLP lead than the treatment chemicals of group one, as illustrated by the comparison of test runs XII and XV for this waste soil, but the combined effect of both groups is even more pronounced in decreasing the leachable lead. Results of these bench-scale studies were confirmed during engineering-scale tests. Single step mixing of 5% lime, 11.76% phosphoric acid and 15% water in a 2000 g hazardous soil diminished the TCLP lead values from 3440 mg/l to 0.77 mg/l in less than 5 hours. Likewise, single step mixing of 300 g Triple Super Phosphate (TSP), 200 g Portland Cement (PC) and 300 ml water in 200 g hazardous soil decreased the TCLP lead to levels below 0.3 mg/l within a relatively short curing time. Single step mixing of both groups of treatment chemicals can dramatically reduce treatment costs making this invention highly attractive and efficient for commercial use.

The first advantage of using lime and phosphoric acid combination over the use of TSP and PC is that in the former a volume decrease of 6% was realized when compared to the original volume of untreated material. In the later case, a volume increase of 37% was measured due to hydration of cement. The second advantage of using phosphoric and lime combination is that the mass increase is less than the mass increase when TSP and PC are added. Quantitatively, the mass increase in this hazardous waste soil treatment was approximately 16.7% due to combination of lime and phosphoric whereas the mass increase was about 40% due addition of TSP and PC. And therefore, those skilled scientists and engineers learning this art from this patent, must make an economic judgement for each lead contaminated process material and waste stream which chemical quantity from each group would be most effective in rendering the treated material non-hazardous.

The third advantage in using lime and phosphoric over the use of TSP and PC is that the former does not change in physical and mechanical properties of original material and if a batch fails for shortage of treatment chemicals, it can be retreated rather easily by adding more of the treatment reagent. The material treated with PC hardens and may form a monolith which is difficult to retreat in case of a batch failure.

EXAMPLE 2

Interchangeability of Two Step Mixing Method

In the lead contaminated soil from the abandoned battery recycling operations, the treatment chemicals of either group can be added first and mixed thoroughly in an amount sufficient to decrease the TCLP lead below the regulatory threshold. Two step mixing method of the group one and group two treatment additives is as effective as single step mixing of same quantity of treatment chemicals selected from group one and group two.

Table IV illustrates data that confirm that the application of group one treatment chemicals in step I is about as effective as application in step II. The same is true for group two treatment chemicals. Thus, the two steps are essentially interchangeable. The reversibility of the steps according to the present invention make it very flexible for optimization during commercial use, scaling up and retreatment of any batches that fail to pass the regulatory threshold criteria.

TABLE IV

| | Treatment-Additives | | | |
|---|---|---|---|---|
| Test Run | Step I | Step II | Total Lead % | TCLP Lead mg/l |
| Two Step Mixing Methods | | | | |
| I | 10% gypsum & 2% lime (Group I) | 12% phosphoric acid (Group II) | 20.8 | 1.8 |
| II | 12% phosphoric (Group II) | 10% gypsum & 2% lime (Group I) | 24.4 | 1.9 |
| III | 10% gypsum (Group I) | 10.6% phosphoric (Group II) | 24.4 | 3.4 |
| IV | 10.6% phosphoric (Group II) | 10% gypsum (Group I) | 22.4 | 3.5 |
| Single Step Mixing Method | | | | |
| V | 10% gypsum and 12% phosphoric | | 23.6 | 3.5 |
| Untreated | Control/Check | | 23.1 | 3440 |

EXAMPLE 3

Retreatability and Single Step Mixing

A sample of hazardous cracked battery casings of ½"–1" size containing 14% to 25.2% total lead and about 3298 mg/l of TCLP was obtained for several test runs of the invention to verify the retreatability of batches that fail because of the insufficient dose of treatment chemical added. The results of initial treatment and retreatment are presented in Table V and compared with single step mixing treatment additives from both groups. About 200 g of hazardous material was treated with 10.5% phosphoric acid, 2.5% gypsum and 1.25% lime, all mixed in one single step. The TCLP lead was decreased from 3298 mg/l to 2.5 mg/l as a result of single step mixing in test run V (TABLE V).

When the amount of additive from group two was less than the optimum dose needed, the TCLP lead decreased from 3298 mg/l to (i) 1717 mg/l when 4.2% phosphoric and 1% lime were added during step I and II respectively and (ii) 2763 mg/l when 4.2% phosphoric and 5% gypsum were added, compared to untreated control.

Since the TCLP lead did not pass the regulatory criteria of 5 mg/l, treated material from test run I and II was retreated during test run III and IV, respectively, using sufficient amounts of phosphoric acid (an additive from group two) in sufficient amount to lower the TCLP lead to 2.4 mg/l and 2.5 mg/l, respectively. Furthermore, this example confirms that lime is more effective in decreasing TCLP lead than gypsum among different additives of group one. And as a result, the requirement of group two treatment reagent is lessened by use of lime over gypsum. The example also illustrates that one or more compounds of the same group can be used together to meet the regulatory threshold limit.

TABLE V

| | Treatment Additives | | |
|---|---|---|---|
| | Two Step Mixing Methods | | |
| Test Run | Step I | Step II | TCLP Lead mg/l |
| I | 4.2 phosphoric | 1% lime | 1717 |
| II | 4.2% phosphoric | 5% gypsum | 2763 |
| Untreated Control | | | 3296 |
| | Retreatment (Single Step Mixing) Method | | |
| III-I | 6.8% phosphoric | | 2.4 |
| IV-II | 8.5% phosphoric | | 3.5 |
| | Single Step Mixing | | |
| V | 10.5% phosphoric, 2.5% gypsum, 1.25% lime | | 2.5 |

EXAMPLE 4

Wide Range of Applications and Process Flexibility in Curing Time, Moisture Content and Treatment Operations TABLE VI illustrates different types of waste matrix that have been successfully treated employing the one step and two step mixing treatment additives from group one and group two. For these diverse waste types and process materials, total lead ranged from 0.3% to 23.5%. This example discloses the flexibility and dynamics of the treatment process of the invention in rendering nonhazardous, by RCRA definition, a wide range of lead-hazardous and other metal-hazardous materials within a relatively short period of time, usually in less than 5 hours. It is expected that this process will also render bismuth, cadmium, zinc, chromium (III), arsenic (III), aluminum, copper, iron, nickel, selenium, silver and other metals also less leachable in these different types of wastes. The moisture content of the waste matrix is not critical and the invented process works on different process materials and waste types independent of the moisture content. The treatment operations can be carried out at any level—bench, engineering, pilot and full-scale, on relatively small amounts of hazardous waste material in laboratory to large amounts of contaminated process materials, soils, solid wastes, waste waters, sludges, slurries and sediments outdoor on-site. The process is applicable in-situ as well as ex-situ.

TABLE VI

UNIVERSE OF APPLICATION FOR THE INVENTION MAECTITE TREATMENT PROCESS

| LEAD CONTAMINATED WASTE TYPE | TREATMENT ADDITIVE | TOTAL LEAD % | LEACHABE LEAD (MG/L) Before Treatment | After Treatment | VOLUME DECREASE % |
|---|---|---|---|---|---|
| OLD DIRT | 3.4% Phosphoric* | 2.2 | 164.4 | 1.5 | 16.7 |
| WASTE WITH BROKEN BATTERY CASING | 8.1% Lime 1% Gypsum and 3.4% Phosphoric | 2.7 | 197.5 | ND (<.5) | |
| SLAG-LEAD SMELTER | 10.2% Phosphoric | 6.6 | 21.3 | 2.0 | |
| LEAD-BIRD SHOT | 16% Phosphoric 14% Lime and 30% Gypsum | 16.1 | 3720 | ND (<.5) | |
| LEAD-BUCK SHOT | 16% Phosphoric 14% Lime and 28% Gypsum | 11.4 | 1705 | ND (<.5) | |
| BATTERY CASINGS | 5% Gypsum | 12 | 288 | 0.6 | 0 |
| ORGANIC HUMUS SOIL | 0.5% Lime 2.0% Phosphoric | 1.9 | 23.2 | ND (<.5) | 29 |
| 50:50 MIXTURE OF CASINGS AND SAND | 4% Gypsum 4% Phosphoric | .5 | 687 422.2 | 0.7 0.95 | 3.3 23.6 |
| SOLID WASTE SOIL Contaminated With Tetrethyl lead | 3% Lime 12% Phosphoric | 23.5 | 12.0 | 6.0 | |
| SOIL CONTAMINATED WITH LEADED GASOLINE | 10% Gypsum 6% Phosphoric 3% Lime 5.1% Phosphoric | 4.74 3.2 | 590 213 | 3.7 1.6 | |
| CARBON WITH LEAD DROSS | 4.7% Phosphoric | 12.6 | 105.6 | 0.5 | |
| WIRE FLUFF | 1.7% Phosphoric | 0.3 | 19 | 0.7 | |
| WIRE CHIP | 0.75% Phosphoric | 0.4 | 28 | ND (<.2) | |
| LAGOON SEDIMENT | 0.6% TSP 0.5% Phosphoric | 0.3 | 3.9 5.6 | 0.23 0.3 | |
| SLUDGE-INDUSTRIAL WASTE | | 2.2 | 59.3 | 1.6 | |
| RCRA ORGANIC SLUDGE | 0.6% Phosphoric 10% Gypsum | 9.4 | 580 | ND (<.5) | |
| FILTER CAKE | 8.5% Phosphoric | 2.9 | 245.3 | 1.1 | |
| GRAVEL | 5% Gypsum 2.2% Phosphoric | 0.16 | 7.5 | 0.5 | |
| ROAD GRAVEL | 10% Gypsum 8.4% Phosphoric | 0.34 | 46 | ND (<.5) | |
| MIXTURE OF BATTERY | 2.5% Gypsum | | | | |

TABLE VI-continued

UNIVERSE OF APPLICATION FOR THE
INVENTION MAECTITE TREATMENT PROCESS

| LEAD CONTAMINATED WASTE TYPE | TREATMENT ADDITIVE | TOTAL LEAD % | LEACHABE LEAD (MG/L) | | VOLUME DECREASE % |
|---|---|---|---|---|---|
| | | | Before Treatment | After Treatment | |
| CASINGS (SOLID WASTE) AND SOIL | 3.4% Phosphoric | 1.3 | 75 | 0.6 | 19.6 |
| INDUSTRIAL WASTE (B) | 1 g Lime 3.4% Phosphoric | 2.75 | 91 | 0.7 | |
| INDUSTRIAL PROCESS MAT. (G) | 3.4% Phosphoric | 1.3 | 61 | ND (<.5) | |
| SOIL (B) | 3.4% Phosphoric | 4.1 | 129.5 | 0.6 | 25.6 |
| SOIL (S) | 50% Gypsum | 11 | <0.01 | | |
| SOIL (O) | 1.3% Phosphoric | 0.38 | 34.6 | ND (<.5) | |
| SOIL (C) | 5% Lime 8.5% Phosphoric | 11.78 | 130.6 | 0.33 | |
| BATTERY CASINGS | 5% Gypsum 3.4% Phosphoric | 2.5 | 110.1 | 1.9 | |
| GRAY CLAY SOIL | 5% Trisodium Phosphate | 2.2 | 46.6 | 0.2 | |

EXAMPLE 5

Nearly twenty (20) different chemicals and products from various vendors and supply houses were screened for chemical fixation of leachable lead in hazardous solid waste samples. Only six (6) of these treatments chemicals were found effective in decreasing the leachable lead as measured by: (1) the EP Toxicity Test and (2) the TCLP Test. Table VII presents a summary of leachable lead found in untreated and treated waste samples allowed to cure for a minimum of 4 hours after treatment with at least one of the effective chemicals. Treatment chemicals found relatively ineffective for lead fixation included a variety of proprietary products from American Colloid Company and Oil Dri, different sesquioxides like alumina and silica, calcium silicate, sodium silicate, Portland cement, lime, and alum from different vendors. Results for these ineffective chemicals are not shown in Table VII.

TABLE VII

Relative effectiveness of various treatment chemicals screened to decharacterize the lead-toxic solid wastes

| | Treatment Chemical (Step) | Leachable Lead in mg/l | |
|---|---|---|---|
| | | EP Toxicity Test | TCLP Test |
| I. | Untreated Control | 221.4 | 704.5 |
| II. | Single Treatment Chemical (One Step Treatment) | | |
| | a. Sulfuric Acid (I) | 11.7 | 39.8 |
| | b. Phosphoric Acid (I) | 1.0 | 5.9 |
| | c. Superphosphate Granular (I) | 2.7 | 11.4 |
| | d. Liquid Phosphate Fertilizer (I) | 19.4 | 64.3 |
| | e. Gypsum Powder (I) | 24.9 | 81.8 |
| | f. Sodium Phosphate (I) | 28.7 | 93.9 |
| III. | Two Step Treatment | | |
| | g. Sulfuric (I) & Lime (II) | 20.6 | 68.1 |
| | h. Gypsum Powder (I) & Alum (II) | 3.9 | 15.3 |
| | i. Sodium Phosphate (I) & Phosphoric (II) | 3.1 | 12.6 |

TABLE VII-continued

Relative effectiveness of various treatment chemicals screened to decharacterize the lead-toxic solid wastes

| | Treatment Chemical (Step) | Leachable Lead in mg/l | |
|---|---|---|---|
| | | EP Toxicity Test | TCLP Test |
| | j. Gypsum (I) & Phosphoric (II) | N.D.* | 1.6 |
| IV. | Three Step Treatment | | |
| | k. Gypsum (I), Alum (II) & Sodium Phosphate (III) | 12.8 | 43.3 |
| | l. Gypsum (I), Phosphoric (II) & Sodium Phosphate (III) | N.D.* | 1.4 |

*N.D. means non-detectable at <0.50 mg/l.

Evaluation of a single treatment chemical in one step reveals that phosphoric acid was most effective in fixation of leachable lead followed by granular super-phosphate, a fertilizer grade product available in nurseries and farm supply houses. However, neither treatment effectively treated leachable lead to the USEPA treatment standard of 5.0 mg/l by TCLP methodology.

Although both phosphoric acid and granular superphosphate were effective in meeting the now obsolete EP Toxicity Test criteria at 5.0 mg/l, this test has been replaced by TCLP Test criteria for lead of 5.0 mg/l. Single application of the phosphoric acid, granular superphosphate or any other chemical was short of meeting the regulatory threshold of 5.0 mg/l by TCLP Test criteria for lead.

In a two-step treatment process, application of gypsum during Step I and treatment with phosphoric acid in Step II resulted in decrease of TCLP-lead consistently and repeatedly below the regulatory threshold of 5.0 mg/l. The results of this two-step treatment process utilizing gypsum in Step I and phosphoric acid in Step II are most reliable and hence, the two-step process may be applied to a wide variety of lead contaminated wastes as exhibited in Example II.

A three-step process, as set forth in Table VII, was not perceived to be as economically viable as a two-step treatment process, despite its ability to reduce lead levels in satisfaction of the TCLP Test criteria. A process that employees the beneficial combination of treatment first with a sulfate compound and then with a phosphate reagent in accord with the present invention, in combination with one or more additional treatment steps, may nevertheless be within the scope of the invention.

In order to illustrate the relative proportions of two chemicals, e.g., gypsum and phosphoric acid, needed for treatment of lead-toxic wastes, three soil samples from a lead contaminated test site were processed using the present invention, in which gypsum powder was used in the first step, and phosphoric acid solution in water at concentrations of about 7, 15 and 22 percent by weight in the second step. The soil was measured for lead content in accordance with the EP Toxicity Test before and after treatment. A level of leachable lead below 5 mg/l was considered non-hazardous according to this procedure. During these test runs, the EP Toxicity Test criteria were in force for treated waste material. The results of these tests are set forth in Table VIII:

TABLE VIII

Effectiveness in Fixation and Stabilization of Leachable Lead in Lead Toxic Soils

| | PROCESS STEPS | | EP TOXIC LEAD TEST RESULTS | |
|---|---|---|---|---|
| | | | Before | After |
| Soil Sample (Lead-toxic waste) | Gypsum Step I (g/kg soil) | Phosphoric Step II (g/kg soil) | Treatment mg/l | Treatment mg/l |
| 1. Low lead contamination | 20 | 10 | 8 | <0.1 |
| 2. Moderate contamination | 30 | 20 | 61 | <0.1 |
| 3. High lead contamination | 40 | 30 | 3,659 | 1.7 |

The foregoing results demonstrate that the process of the present invention was effective in all three samples, representing 3 different levels of lead contamination. The process is flexible and is usually optimized during bench scale treatability studies for each waste type to immobilize the leachable lead and to decharacterize or transform the lead-toxic waste into non-toxic solid waste acceptable to TSD facilities under current land ban regulations. A net reduction of 36.4% in waste volume through use of the instant process has been observed. Typical volume reductions are set forth in Table IX.

TABLE IX

Changes in Solid Waste Volume as a Result of Treatment with the Two-Step Process

| | SOLID WASTE VOLUME | | |
|---|---|---|---|
| SOLID WASTE MATERIAL (Treatment Scale) | Initial (Before Application of Process) | Final (After Application of Process and Curing) | Decrease in Waste Volume (%) |
| 1. Low toxic soil (full scale) | 3850 cu. yd. | 2450 cu. yd. | 36.4 |
| 2. Lead-toxic Solid Waste (Bench Scale) | | | |
| Test Run I | 106.1 cu. in. | 81.51 cu. in. | 23.0 |
| Test Run II | 22.0 cu. in. | 17.3 cu. in. | 21.4 |

The most profound effect of the process of the present invention is at a structural level, where the break-down of granular aggregates is associated with a loss of fluffiness and a decrease in pore space and increased compaction due to physical, mechanical and chemical forces at different levels. At a molecular level, phosphoric acid breaks down the minerals containing carbonates and bicarbonates, including cerussites, in stoichiometric proportions. Soon after the addition of phosphoric acid to a solid waste containing cerussites, extensive effervescence and frothing becomes evident for several minutes and sometimes for a few hours. The phosphoric acid breaks down the acid sensitive carbonates and bicarbonates leading to the formation of carbon dioxide, water and highly stable and insoluble sulfate and phosphate mineral compounds. Thus, structural changes due to interlattice reorganization as well as interstitial rearrangement in waste during processing are associated with an overall decrease in waste volume. Depending on the extent of carbon dioxide loss from the breakdown of carbonates and bicarbonates present in the lead-toxic solid waste, the process may lead to a slight loss of waste mass as well. Water generated during the chemical reactions is lost by evaporation, which further decreases the mass and volume of the treated solid wastes and soils.

The cost of the process of the present invention is moderate to low, depending upon (i) waste characteristics, (ii) treatment system sizing, (iii) site access, (iv) internment of final disposition of treated material and (v) site support requirements. The costs of treatment and disposal are presently on the order of $115 per ton of lead-toxic waste, as compared to off-site conventional treatment and disposal costs of over $250 per ton if no treatment in accord with the invention had been performed. Moreover, recent land ban regulations would prohibit the disposal of all lead-toxic wastes in landfills. The foregoing Example makes clear that the process of the present invention provides an efficient technology that is economically attractive and commercially viable in meeting regulatory criteria for landfills.

EXAMPLE 6

The process of the present invention was applied on bench scale to five different lead-toxic waste materials that were characterized for total lead, TCLP-lead, moisture content and pH before and after treatment. A curing time of 5 hours was allowed for completion of the treatment process. The results compiled in Table X exhibit the profound effects of the process in decreasing the TCLP lead in a wide range of lead-toxic soils and solid wastes containing total lead as high as 39,680 mg/kg and TCLP lead as high as 542 mg/l. In each of the five cases, the instant process immobilizes the leachable lead to levels below the regulatory threshold of 5 mg/l set by the TCLP Test criteria for lead currently in force under the land ban regulations of the United States Environmental Protection Agency.

TABLE X

Typical changes in solid waste characteristics due to process effects

| | MEASURED VALUES | |
|---|---|---|
| SOLID WASTE HARACTERISTICS | Before Treatment | After Treatment & Curing |
| I. Lead-toxic SW-A | | |
| Total lead, % | 1.442 | 1.314 |
| TCLP-Lead, mg/l | 542.0 | 2.0 |

TABLE X-continued

Typical changes in solid waste characteristics due to process effects

| SOLID WASTE HARACTERISTICS | MEASURED VALUES | |
| --- | --- | --- |
| | Before Treatment | After Treatment & Curing |
| Moisture, % | 23.0 | 33.0 |
| pH, S.U. | | |
| II. Lead-toxic SW-B | | |
| Total lead, % | 0.847 | 0.838 |
| TLCP-Lead, mg/l | 192.0 | 2.4 |
| Moisture, % | 27 | 36 |
| pH, S.U. | | |
| III. Lead-toxic SW-C | | |
| Total lead, % | 3.968 | 3.066 |
| TLCP-Lead, mg/l | 257.6 | 1.0 |
| Moisture, % | 10.0 | 18.1 |
| pH, S.U. | 7.2 | 4.5 |
| IV. Lead-toxic SW-D | | |
| Total lead, % | 2.862 | 2.862 |
| TLCP-Lead, mg/l | 245.3 | 0.38 |
| Moisture, % | 71.6 | 84.1 |
| pH, S.U. | 8.1 | 6.3 |
| V. Lead-toxic SW-E | | |
| Total lead, % | 0.16 | 0.12 |
| TLCP-Lead, mg/l | 7.5 | 1.87 |
| Moisture, % | 12.3 | 23.0 |
| pH, S.U. | 7.0 | 5.4 |

It is obvious from Table X that the instant process operates over a wide range of moisture and pH conditions. It is associated with 8 to 11% rise in moisture content. The end product of the treatment process may contain moisture in a typical range of 18% to 36% on a dry weight basis. The end product passes the Paint Filter Test for solids and there are not other byproducts or side streams generated during the process. The treated solid waste is cured in 4 to 5 hours and may be allowed to dry for 2 to 3 days after treatment for loss of unwanted moisture prior to final internment and disposition. This time is sufficient for the TCLP Tests to be completed as part of the disposal analysis under land ban regulations enforced by the USEPA.

It is necessary to establish the quantities of gypsum and phosphate reagent on a case-by-case basis, because the consumption of these materials will depend not only upon the initial lead level in the waste or soil, but also upon other waste characteristics such as cation exchange capacity, total buffering capacity, and the amounts of carbonates and bicarbonates present, among others. Bench scale treatability studies for each solid waste considered will be necessary to determine the optimum levels of the materials that are employed. The treatability studies are designed to optimize the amount and grade of gypsum powder (or other sulfate compound) needed during step I, and the amount and concentration of phosphoric acid (or other phosphate compound) needed in step II for cost-effective operation of the treatment system. Those skilled in the art are knowledgeable of such bench studies, which are usually carried out as precursors to full scale treatment.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A method of treating metal-bearing materials to stabilize leachable metal contained therein, said method comprising the steps of:

mixing a metal-bearing material with a first mixture comprising a first component and a second component to form a second mixture, wherein said metal-bearing material contains at least one leachable metal selected from the group consisting of lead, aluminum, arsenic (III), barium, bismuth, cadmium, chromium (III), copper, iron, nickel, selenium, silver and zinc, wherein said first component supplies at least one member selected from the group consisting of sulphates, halites, and silicates, and wherein said second component supplies at least one phosphate anion;

curing said second mixture for a period to form a cured material such that TCLP metal level for said leachable metal in the cured material is below 5.0 mg/l and no secondary waste streams are generated.

2. A method according to claim 1, wherein said leachable metal is lead and the TCLP lead level in the cured material is below 5.0 mg/l.

3. A method according to claim 1, wherein said cured material is substantially solid in form at the end of curing, the cured material passes the paint filter test, and the volume of said cured material is less than the volume of said metal-bearing material.

4. A method according to claim 1, wherein said first component is at least one member selected from the group consisting of gypsum, lime, alum, halites, sulphates of iron, and sulphates of aluminum.

5. A method according to claim 1, wherein said second component is at least one member selected from the group consisting of phosphoric acid, trisodium phosphate, triple super phosphate, pyrophosphates, potassium phosphates and ammonium phosphates.

6. A method according to claim 1, wherein said step of curing lasts for a period of less than 5 hours.

7. A method according to claim 1, wherein said metal-bearing material is substantially solid and has a moisture content of from about 10 to about 40 percent by weight.

8. A method according to claim 1, wherein said first component is at least gypsum.

9. A method according to claim 1, wherein said second component is phosphoric acid.

10. A method according to claim 1, consisting essentially of said mixing step and said curing step.

11. A method according to claim 1, consisting of said mixing step and said curing step.

12. A method of treating metal-bearing materials to stabilize leachable metal contained therein, said method comprising the steps of:

mixing a metal-bearing material containing leachable metal with a phosphate reagent having at least one phosphate anion for reacting with leachable metal in said metal-bearing material to produce a first mixture, wherein said leachable metal comprises at least one metal selected from the group consisting of lead, aluminum, arsenic (III), barium, bismuth, cadmium, chromium (III), copper, iron, nickel, selenium, silver and zinc, said first mixture containing a substantially insoluble metal compound or mineral species;

mixing said first mixture with a second component to form a second mixture, said second component supplying at least one member selected from the group consisting of sulphates, halites, and silicates; and curing said second mixture for a period to form a cured material such that TCLP metal levels in the cured material are below 5.0 mg/l and no secondary waste streams are generated.

13. A method according to claim 12, wherein said leachable metal is lead and the TCLP lead level in the cured material is below 5.0 mg/l.

14. A method according to claim 12, wherein said cured material is substantially solid in form at the end of curing, the cured material passes the paint filter test, and the volume of said cured material is less than the volume of said metal-bearing material.

15. A method according to claim 12, wherein said phosphate reagent is at least one member selected from the group consisting of phosphoric acid, trisodium phosphate, triple super phosphate, pyrophosphates, potassium phosphates and ammonium phosphates.

16. A method according to claim 12, wherein said second component is at least one member selected from the group consisting of gypsum, alum, halites, sulphates of iron, and sulphates of aluminum.

17. A method according to claim 12, wherein said step of curing lasts for a period of less than 5 hours.

18. A method according to claim 12, wherein said phosphate reagent is phosphoric acid.

19. A method according to claim 12, wherein said second component is at least gypsum.

20. A method according to claim 12, consisting of said two mixing steps and said curing step.

21. A method of treating metal-bearing soil to stabilize leachable metal contained therein, said method comprising the steps of:

mixing a metal-bearing soil with a first mixture comprising a first component and a second component to form a second mixture, wherein said metal-bearing soil contains at least one leachable metal selected from the group consisting of lead, aluminum, arsenic (III), barium, bismuth, cadmium, chromium (III), copper, iron, nickel, selenium, silver and zinc, wherein said first component supplies at least one member selected from the group consisting of sulphates, halites and silicates, and wherein said second component supplies at least one phosphate anion;

curing said second mixture for a period to form a cured material such that TCLP metal level for said leachable metal in the cured material is below 0.5 mg/l and no secondary waste streams are generated.

22. A method according to claim 21, wherein said first component is at least one member selected from the group consisting of gypsum, alum, halites, sulphates of iron, and sulphates of aluminum.

23. A method according to claim 21, wherein said second component is at least one member selected from the group consisting of phosphoric acid, trisodium phosphate, triple super phosphate, pyrophosphates, potassium phosphates and ammonium phosphates.

24. A method according to claim 21, wherein said first component is gypsum.

25. A method according to claim 21, wherein said second component is phosphoric acid.

26. A method of treating metal-bearing soil to stabilize leachable metal contained therein, said method comprising the steps of:

mixing a metal-bearing soil containing leachable metal with a phosphate reagent having at least one phosphate anion for reacting with leachable metal in said metal-bearing soil to produce a first mixture, wherein said leachable metal comprises at least one metal selected from the group consisting of lead, aluminum, arsenic (III), barium, bismuth, cadmium, chromium (III), copper, iron, nickel, selenium, silver and zinc, said first mixture containing a substantially insoluble metal compound or mineral species;

mixing said first mixture with a second component to form a second mixture, said second component supplying at least one member selected from the group consisting of sulphates, halites and silicates; and curing said second mixture for a period to form a cured material such that TLCP metal levels in the cured material are below 5.0 mg/1 and no secondary waste streams are generated.

27. A method according to claim 26, wherein said phosphate reagent is at least one member selected from the group consisting of phosphoric acid, trisodium phosphate, triple super phosphate, pyrophosphates, potassium phosphates and ammonium phosphates.

28. A method according to claim 26, wherein said second component is at least one member selected from the group consisting of gypsum, alum, halites, sulphates of iron, and sulphates of aluminum.

29. A method according to claim 26, wherein said phosphate reagent is phosphoric acid.

30. A method according to claim 26, wherein said second component is gypsum.

31. A method of treating metal-bearing soil to stabilize leachable metal contained therein, said method comprising the steps of:

mixing a metal-bearing soil with a first mixture comprising gypsum and a second component comprising a phosphate source to form a second mixture, wherein said metal-bearing soil contains at least one leachable metal selected from the group consisting of lead, aluminum, arsenic (III), barium, bismuth, cadmium, chromium (III), copper, iron, nickel, selenium, silver and zinc, and wherein said second component supplies at least one phosphate anion;

curing said second mixture for a period to form a cured material such that TCLP metal level for said leachable metal in the cured material is below 5.0 mg/l and no secondary waste streams are generated.

* * * * *